United States Patent
Horn et al.

(10) Patent No.: US 6,512,197 B2
(45) Date of Patent: Jan. 28, 2003

(54) LASER CUTTING MACHINE AND METHOD

(75) Inventors: Armin Horn, Renningen (DE); Uwe Mienhardt, Korntal-Münchingen (DE); Wolfgang Scholich-Tessmann, Böblingen (DE)

(73) Assignee: Trumpf Werkzeugmaschinen GmbH & Co., Ditzingen (DE)

( * ) Notice: Subject to any disclaimer, the term of this patent is extended or adjusted under 35 U.S.C. 154(b) by 0 days.

(21) Appl. No.: 10/094,446

(22) Filed: Mar. 7, 2002

(65) Prior Publication Data
US 2002/0125233 A1 Sep. 12, 2002

(30) Foreign Application Priority Data
Mar. 8, 2001 (EP) .......................................... 01105352

(51) Int. Cl.[7] .............................................. B23K 26/38
(52) U.S. Cl. ................................................. 219/121.67
(58) Field of Search ........................ 219/121.6, 121.67, 219/121.68, 121.69, 121.7, 121.71, 121.72, 121.83, 121.85

(56) References Cited

U.S. PATENT DOCUMENTS

| | | |
|---|---|---|
| 5,045,669 A | 9/1991 | Ortiz, Jr. et al. |
| 5,204,517 A | 4/1993 | Cates et al. |
| 5,340,962 A * | 8/1994 | Schmidt et al. |
| 6,008,465 A | 12/1999 | Horn |

FOREIGN PATENT DOCUMENTS

| | | |
|---|---|---|
| EP | 0344339 A1 | 12/1989 |
| EP | 0873813 A1 | 10/1998 |
| WO | WO 99114640 | 3/1999 |

* cited by examiner

*Primary Examiner*—Samuel M. Heinrich
(74) *Attorney, Agent, or Firm*—Pepe & Hazard LLP

(57) ABSTRACT

A laser cutting method employs at least two sensors which are operative during the cutting operation to monitor process parameters and send signals indicative of the monitored parameters determining parameters of the cutting operation in which are indicative of the status of the penetration of the workpiece. The signals from each of the sensors is evaluated by comparing the sensed parameters in the signals with usability criteria to determine the usability of the signals. The signal which compares most favorably with the usability criteria therefor is transmitted to the controller to modify the parameters for the cutting workpiece. In the absence of a control signal from the evaluation, the controller proceeds with the cutting in accordance with parameters which are then operative in the controller. Generally, the selected signal effects the speed of relative movement between the workpiece and cutting head.

20 Claims, 2 Drawing Sheets

LASER CUTTING MACHINE AND METHOD

BACKGROUND OF THE INVENTION

The present invention is directed to a process for laser cutting workpieces in which a focal beam is directed at the workpiece being machined and determining when the laser beam pierces the workpiece by a control parameter that is detected and gives the penetration status of the workpiece as soon as the focussed beam has pierced the workpiece. The invention also relates to a device for laser cutting workpieces with a cutting head which sends out a focussed beam, and having a digital control device which has detectors for control parameters giving the penetration status of the workpiece, an evaluation unit connected to the detectors and a control unit connected to the evaluation unit to control the parameters of the cutting process.

In most cutting work using a focussed laser beam, the beam must pierce the workpiece. In these cases, the earliest possible detection of the time of penetration is of the greatest importance. If a cut is to be made, the piercing of the focussed beam of the workpiece marks the time when the relative movement of the focussed beam and the workpiece necessary to make the cut can start. When workpieces are cut by a focussed beam, the cutting process at a given point ends with the piercing of the workpiece and thus reaches that point in time in the process when the workpiece being machined can be exchanged for another workpiece to be machined or when the focal beam can be directed somewhere else on the workpiece to continue machining with corresponding control of the process or tooling machine. Always, early detection of the time when the workpiece is pierced makes it possible to minimize the elapsed time for the cutting operation and thus optimize the whole process. To prevent defective machining of workpieces, it must be guaranteed that the time of piercing will be detected with great certainty. Thus, in the example of making a cut, the relative movement of the focussed beam and the workpiece may only start and continue when the focussed beam has actually pierced the workpiece.

Conventional processes and devices for early detection of the piercing time of a focussed beam on a workpiece and conversion of early detection of the piercing point into process and device control are described in U.S. Pat. No. 6,008,465 and EP-A-0 344 339.

In U.S. Pat. No. 6,008,465, the resistance value of the electrical resistance of the medium or plasma is detected on a laser cutting machine between the cutting head of the machine and the workpiece being machined. During the penetration phase of the laser beam, the electrical resistance of the plasma has a relatively low value. Upon the piercing of the workpiece, there is a sudden rise in the resistance value. This rise in electrical resistance is converted into a control signal for the laser cutting machine and thus produces relative movement of laser cutting head and the workpiece to make a cut in a predetermined path.

IN EP-A-0 344 339, the intensity of the light emitted from the machining site of the laser beam on the workpiece is used as the control parameter for the process and machine controller. This light intensity is abruptly reduced as soon as the laser beam has pierced the workpiece.

It is the object of the present invention to provide a novel method for controlling the laser beam and machine controls for relative movement of the laser cutting head and workpiece.

It is also an object to provide a novel laser cutting machine incorporating improved sensing of the apparatus processing condition for controlling the cutting and relative movement of the workpiece and cutting head.

SUMMARY OF THE INVENTION

It has now been found that the foregoing and related objects may be readily attained in a method for laser cutting of workpieces using a laser cutting installation including a workpiece support, a laser beam generator generating a laser beam, a laser cutting head with a nozzle through which the laser beam exits, means for effecting relative movement between a workpiece on the support and the cutting head, and a controller for controlling the laser beam and the movement means in accordance with parameters for the cutting of the workpiece.

The laser beam is focussed on the workpiece on the support to cause the laser beam to penetrate the workpiece, and parameters of the cutting operation in progress are sensed at least two sensors which generate signals indicative of the status of the penetration of the workpiece. The signals from each of the sensors are evaluated by comparing the sensed parameters in the signals with usability criteria to determine the usability of the signals. The signal which compares most favorably with the usability criteria therefor is selected and transmitted to the controller so that the observed parameters of the selected signal modify the parameters for the cutting of the workpiece.

In the absence of a control signal from the evaluation step, the machine proceeds with the cutting in accordance with parameters then operative in the controller. Generally, the selected signal is operative to control the speed of relative movement between the workpiece and the cutting head.

Desirably, one of the sensors detects the resistance between the nozzle and the workpiece, and another sensor detects the intensity of the light generated at the cutting site. The latter sensor includes a photodiode. In one embodiment of the process, a second sensor detects the intensity of the laser beam upstream in the path from the generator to the nozzle.

Preferably, the evaluating step involves comparing multiple parameters in each signal with the usability criteria, and one of those parameters is the gradient in the path of the control signal over time in relation to a threshold value for the relative control signal level.

A laser cutting machine for conducting the process has a support for a workpiece, a cutting head which emits a focussed laser beam that penetrates the workpiece being machined and finally pierces it, and means for effecting relative movement between the workpiece and cutting head. It includes a digital machine control assembly with at least two detectors to detect control parameters relating to the status of penetration of the workpiece by the laser beam and to transmit signals corresponding to the detected control parameters. An evaluation unit receives the signals from the detectors and includes means for producing a control signal. A control unit is connected to the evaluation unit to receive signals therefrom and to control the parameters of the cutting process.

The control assembly is operative before the workpiece is pierced by the focussed laser beam, and at least two control parameters are detected simultaneously and continuously by the detectors. The evaluation unit is adapted to compare the signals received from the detectors with predetermined usability criteria for the signals received from each sensor, and it determines the detector signal which compares most favorably with its set of usability criteria. A control signal based upon the selected signal is transmitted to the control unit.

If all detector signals fail to meet the usability criteria, the evaluating unit emits no control signal.

Preferably, at least two potential control parameters are detected at the same time, and a single potential control parameter is detected simultaneously several times. In both cases, at least two different potential control signals are generated on the basis of detections of control parameters. Each of these control signals is then checked for its usability, i.e., for its reliability in terms of the penetration status of the workpiece, before the workpiece is pierced. If none of the potential control signals checked proves reliable enough, then it reverts to a control signal different from the potential control signals checked for further process and machine control to ensure functionally proper process and machine control. This "help" control signal can also be produced on the basis of a process parameter that is independent of the actual penetration status of the workpiece, but that also allows it to go back to that penetration status. One example of this that can be given is the length of time the workpiece is acted on by the focal beam, as the basis for producing the "help" control signal which may be stored in the controller. In each case, it is guaranteed that the process and machine control is based on a control signal that has great enough reliability in terms of the penetration status of the workpiece being machined and that accordingly allows the process to run and the machine to operate in a way that is functionally safe. This functional safety of the process and the device in the invention is thus ensured in the event of changing machining conditions as well. But the reliability of the individual control parameters or control parameter detections, in terms of the penetration status of the workpiece, can fluctuate depending on the material or the thickness of the material; multiple detection of control parameters, with subsequent production of several potential control signals, and a check of their usability therefore ensures that the actual control signal last used for process and machine control is a control signal that is reliable in terms of the penetration status of the workpiece being machined.

With the intensity of the process light emitted at the machining site of the focal beam and with the electrical resistance of the medium between the cutting head and the workpiece being machined, control parameters are detected which characteristically reflect the penetration status of the workpiece being machined and whose detection is reliable and possible at a relatively low manufacturing expense. For example, at least one photodiode can be used to detect the intensity of the process light emitted at the machining site of the focal beam.

The value of the gradients of the path of the control signal over time in relation to a threshold value for the gradients and/or the value of the relative control signal level (actual control signal level in relation to a maximum value of the control signal level) in relation to a threshold value for the relative control signal level may be used as the usability criterion by which the potential control signals are checked. The last usability criterion is primary, qualifies and can be met. The relativization of the level of the control signal in the invention is used to make the levels of different control signals produced on different bases comparable to one another.

BRIEF DESCRIPTION OF THE DRAWINGS

The invention will be explained in greater detail below using highly schematic drawings of two examples of embodiment. Two versions of a device for flame-cutting sheet metal with a laser beam are shown.

DETAILED DESCRIPTION OF THE PREFERRED EMBODIMENT

Figure 1:
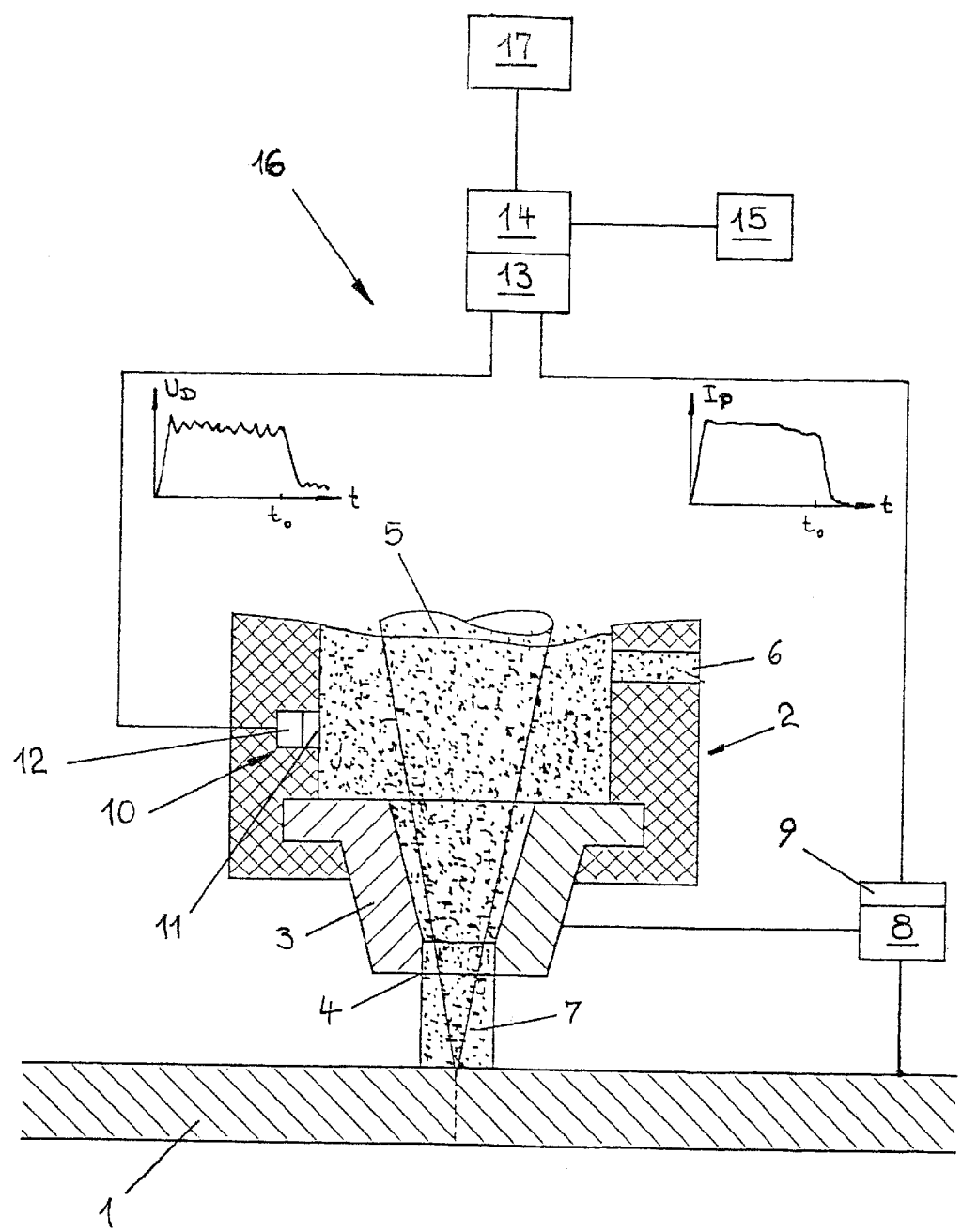
FIG. 1 is a diagrammatic illustration of a fragmentarily shown laser cutting machine cutting head and control elements generating plasma as shown through the workpiece, the control circuitry and graphic representations of the determined signals.

Turning first to FIG. 1, a device for laser cutting workpieces shaped like metal sheets 1 has a laser cutting head 2 with a laser nozzle 3 made of an electrically conductive material. The laser nozzle 3 is electrically insulated from other parts of the laser cutting head 2. At the exit or lower end 4 of the nozzle 3, a focussed laser beam 5 comes out of the laser cutting head 2 and is directed at the metal sheet 1. As shown by the dashed line in FIG. 1, the laser beam 5 pierces the sheet after a penetration phase. Cutting gas, nitrogen in the example shown, goes into the laser cutting head 2 through a gas line 6. A stream of cutting gas 7 leaves the laser cutting head 2 through the exit end 4 of the nozzle 3 and impinges upon the sheet metal 1.

A resistance measurement device or sensor 8 is connected between the electrically conductive laser nozzle 3 and to the sheet metal 1, which is also electrically conductive, and coupled to a signal sender 9.

There is also a photodiode sensor generally designated by the numeral 10 inside the laser cutting head 2 adjacent the nozzle 3, and it has a photosensitive part or diode 11 and a signal sender 12. The sender 12 is also connected to an analog/digital converter (A/D converter) 13, as is the signal sender 9 of the resistance measurement device 8. The A/D converter 13 is in turn connected to an evaluation computer 14 which is also connected to a time measurement device 15.

An evaluation system generally designated by the numeral 16 is provided by the evaluation computer 14 together with the signal senders 9, 12 and the A/D converter 13. The evaluation system 16 is connected to a control unit 17 to control the parameters of the cutting process.

The resistance measurement device 8 and the photosensitive part 11 of the photodiode sender 10 form detectors to detect potential control parameters for control of the laser cutting device shown and to control the process carried out by that device. With the resistance measurement device 8 as a potential control parameter, the electrical resistance of the medium or plasma between the laser cutting head 2 and the sheet metal 1 is detected. The photosensitive part 11 of the photodiode 10 detects the intensity of the process light emitted at the machining site of the laser beam 5 and inside the laser cutting head 2. Both the electrical resistance and the light intensity are dependent on the status of the penetration of the sheet metal 1 by the laser beam 7.

During the penetration phase of the laser beam 5 into the sheet metal 1, the electrical resistance of the medium between the laser cutting head 2 and the sheet metal 1 has a relatively low value. At the same time, the process light emitted at the machining point has a relatively high intensity. An abrupt change in ratios occurs as soon as the laser beam 5 pierces the sheet metal 1. At that time, the value of the electrical resistance rises sharply, and the intensity of the process light emitted at the machining site falls abruptly. Corresponding signals are produced on the basis of which control parameters are detected by the resistance measurement device 8 and the photosensitive part 11 of the photodiode 10 and their signal senders 9, 12. The paths of the signals are shown schematically in FIG. 1.

A time-dependent current signal is emitted by the signal sender 9 of the resistance measurement device 8 and this reflects the time progression of the current intensity $I_P$ of that current which is assigned to the electrical resistance of the medium between the laser nozzle 3 and the sheet metal 1.

The signal sender 12 of the photodiode sensor 10 gives a time-dependent voltage signal. This voltage signal corresponds to the time of the diode voltage $U_D$ at photodiode sensor 10 and is determined by the time progression of the intensity of the process light at the machining site of the laser beam 5 detected by the photodiode 11.

The signals given by the signal senders 9, 12 are analog in nature and form potential control signals, i.e., these signals are the basis for controlling the laser cutting device and the laser cutting process, depending on the penetration status of the laser beam 5 through the sheet metal 1.

The decision of which of the two potential control signals may be used as the actual control signal to control the device and the process is made by the evaluation unit 16 which evaluates the usability of the two potential control signals. For this purpose, the analog signals coming from the signal senders 9, 12 are first converted into digital signals by the A/D converter 13. For each of the digitized potential control signals, the evaluation computer 14 detects the value of the gradient of the path of the control signal over time and the value of the relative control signal level. The values of the relative control signal levels are determined as actual values of the control signal level in relation to a respective maximum value. The maximum values for the control signal level are reference values which are stored in the controls of the laser cutting device and/or are found empirically based upon machining of a sample workpiece. At a certain time, the values of the gradient of the path of the control signal over time and the values found for the relative control signal level are each compared with a threshold value which has also been found empirically.

For further control of the laser cutting device and the laser cutting process if only one of the digitized potential control signals is over the accompanying threshold value, both with the value of the gradient of the path of the control signal and also with the value of the relative control signal level. This potential control signal is used as the actual control signal. If both potential control signals evaluated meet the usability criteria described hereinbefore, then further machine and process control will be based on that potential control signal which most exceeds the accompanying threshold value with the value of its relative control signal level.

If the two usability criteria mentioned are met by neither of the potential control signals evaluated, then further machine and process control takes place using a programmed control signal that is generated for the laser beam 5 depending on the time it acts on the sheet metal 1 as determined by means of the time measurement device 15. The point in time of the usability check described above and the selection of the actual control signal is chosen so that the laser beam 5 will not yet have penetrated the sheet metal. Until the conclusion of the usability check of the two potential control signals, machine and process control also takes place on the basis of a control signal produced using a programmed time for the sheet metal 1 to cut or penetrated by the laser beam 5. Depending on the results of the usability check, then either a change is made to a potential control parameter evaluated, or the programmed control signal dependent on the time the sheet metal 1 is being cut by the laser beam 5 is used.

By the evaluation of the control signal selected from the potential control signals checked as the actual control signal, the evaluation unit 16 determines the time when the laser beam 5 will pierce the sheet metal 1. As soon as it knows the penetration time, the evaluation unit 16 produces a functional correction of the machine and process control by direction of the control unit 17 to use the parameters of the cutting process. In the example shown, this consists of controlling the speed of relative movement of the laser cutting head 2 and sheet metal 1 in the direction of the cut to be made. Accordingly, the process proceeds with machine and process control taking place based on the time the sheet metal 1 is being penetrated by the laser beam 5. The preprogrammed time for the laser beam 5 to act on the sheet metal 1 is adjusted by the observed parameters only after the usability check to provide increased reliability. This guarantees that, when control depends on action time, the sheet metal 1 is pierced in any case by the laser beam 5. This adjustment is generally effected by increasing or decreasing speed of relative motion although other factors may also be controlled.

The development of the analog signals coming from the signal sensors 9, 12 as a result of the piercing of the sheet metal 1 by the laser beam 5 can be seen from the path of the signals graphically shown in FIG. 1. At the piercing time $t_o$, the diode voltage $U_D$ and the current intensity $I_P$ fall abruptly.

Figure 2:
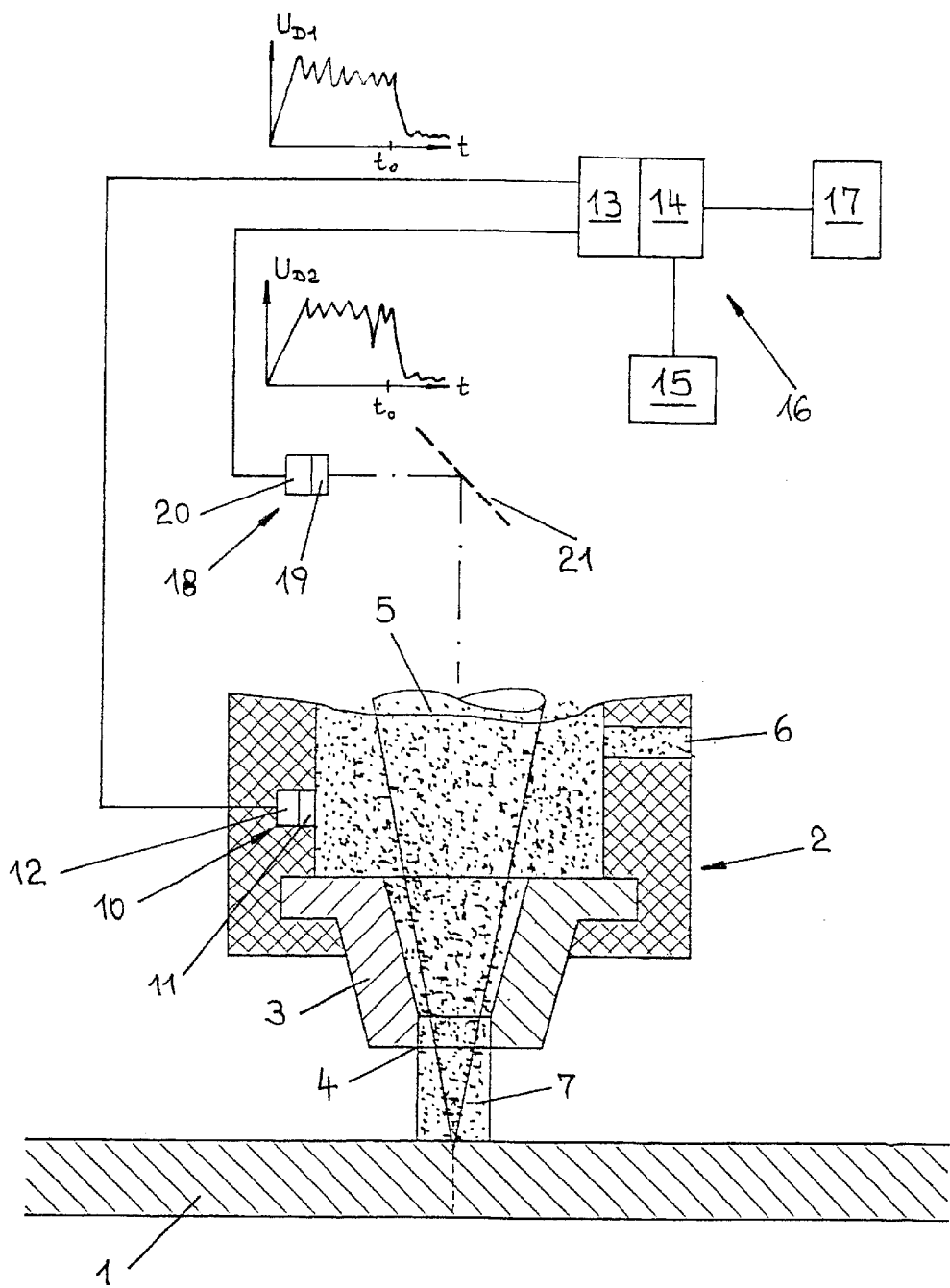
FIG. 2 is a similar diagrammatic illustration of another control arrangement for the cutting process.

The laser cutting device shown in FIG. 2 is different from the embodiment shown in FIG. 1 in that it has a second photodiode 18 instead of a resistance measurement device with a signal sender. This photodiode 18 also includes a photosensitive part 19 and a signal sender 20. The laser cutting devices in FIGS. 1 and 2 are otherwise identical in design and function, and the components which correspond to one another have been given the same reference numbers and letters.

As can be seen in from FIG. 2, the photodiode 18 is placed some distance away from photodiode 10 in the beam delivery path of the laser cutting head 2. In the example shown, the photodiode 10 is on the exit side of the deflection mirror 21, and the photodiode 18 is in a path between the deflection mirror 21 and the laser generator (not shown). The photosensitive part 19 of photodiode 18 detects the intensity of the process light emitted at the machining site of all the laser beam 5. As a result of their different arrangements, photodiodes 10, 18 thus detect the process light in different areas.

Based on each of the two detections of control parameters done by photodiodes 10, 18, a potential control signal is produced in the form of a voltage signal. The potential control signal for the control parameter detection done by photodiode 10 thus gives the time-dependent path of the diode voltage $U_{D1}$ at photodiode 10, the potential control signal for the control parameter detection done by photodiode 18 gives the time-dependent path of diode voltage $U_{D2}$ at photodiode 18. Based on the different positions of the photodiodes 10, 18 despite their structural equality, the potential control signals produced are different from one another.

The two analog potential control signals in the evaluation unit 16 are processed as described above for FIG. 1. Also in the case of the design in FIG. 2, if none of the potential control signals meets the usability criteria upon which the usability check is based, the machine and process control is based on the control signal that is produced depending on the time the sheet metal 1 is acted upon by the laser beam 5.

The two devices shown and the processes carried out with them feature high process safety even with changing tooling ratios.

Thus, the potential control signals produced, depending on the nature of the material or the thickness of the workpiece being machined or the type of laser operation (continuous wave operation, or pulse operation) have different reliabilities. However, the usability check ensures that the control signal used for machine and process control will be reliable in terms of the penetration status of the sheet metal 1 and is therefore functionally safe. Different usage conditions can be covered this way at the same time.

Having thus described the invention, what is claimed is:

1. In a method for laser cutting of workpieces, the steps comprising:
   (a) providing a laser cutting installation including a workpiece support, a laser beam generator generating a laser beam, a laser cutting head with a nozzle through which said laser beam exits, means for effecting relative movement between a workpiece on the support and said cutting head, and a controller for controlling said laser beam and the movement means in accordance with parameters for the cutting of the workpiece;
   (b) focusing the laser beam on a workpiece on said support to cause said laser beam to penetrate said workpiece;
   (c) determining parameters of the cutting operation in progress by at least two sensors which generate signals indicative of the status of the penetration of said workpiece by said laser beam;
   (d) evaluating said signals from each of said sensors by comparing the sensed parameters in said signals with usability criteria to determine the usability of said signals;
   (e) selecting the signal which compares most favorably with said usability criteria therefor; and
   (f) transmitting to said controller the observed parameters of the selected signal to modify the parameters for the cutting of said workpiece.

2. The method for cutting of workpieces in accordance with claim 1 wherein said controller, in the absence of a control signal from said evaluation, proceeds with the cutting in accordance with parameters then operative in said controller.

3. The method for laser cutting of workpieces in accordance with claim 1 in which said selected signal controls the speed of relative movement between said workpiece and cutting head.

4. The method for laser cutting of workpieces in accordance with claim 1 wherein one of said sensors detects the resistance between said nozzle and said workpiece.

5. The method for laser cutting of workpieces in accordance with claim 1 wherein one of said sensors detects the intensity of the light generated at the cutting site.

6. The method for laser cutting of workpieces in accordance with claim 5 wherein a second sensor detects the intensity of the laser beam in the path from the generator to the nozzle.

7. The method for laser cutting of workpieces in accordance with claim 5 wherein said evaluation includes determining whether the value of the gradient of the path of the control signal over time exceeds a predetermined threshold value for the gradient which comprises a usability criteria.

8. The method for laser cutting of workpieces in accordance with claim 1 wherein said evaluating step involves comparing multiple parameters in each signal.

9. The method for laser cutting of workpieces in accordance with claim 1 wherein one of said sensors detects the resistance between said nozzle and said workpiece, and one of said sensors detects the intensity of the light generated at the cutting site.

10. In a laser cutting machine, the combination comprising:
    (a) a support for a workpiece;
    (b) a cutting head which emits a focussed laser beam that penetrates the workpiece being machined and finally pierces it;
    (c) means for effecting relative movement between the workpiece and said cutting head; and
    (d) a digital machine control assembly that includes
        (i) at least two detectors to detect control parameters relating to the status of penetration of the workpiece by the laser beam and to transmit signals corresponding to the detected control parameters;
        (ii) an evaluation unit receiving the signals from said detectors; and including means for producing a control signal; and
        (iii) a control unit connected to the evaluation unit to receive signals therefrom and to control the parameters of the cutting process, said control unit being operative before the workpiece is pierced by the focussed laser beam to detect at least two control parameters simultaneously and continuously;
    said evaluation unit being adapted to compare the signals received from said detectors with predetermined usability criteria for the signals received from each such sensor, said evaluation unit determining the detector signal which compares most favorably with its set of usability criteria and transmitting a control signal based thereon to said control unit, said evaluating unit emitting no control signal if all detector signals fail to meet said usability criteria.

11. The laser cutting machine in accordance with claim 10 wherein said control assembly, in the absence of a control signal from said evaluation unit, relies upon existing parameters in said control unit to control the laser beam and said means for effecting relative movement between the workpiece and said cutting head.

12. The laser cutting machine in accordance with claim 10 wherein said evaluation unit compares multiple criteria in the signals from the detectors with usability criteria and requires favorable comparison with at least two usability criteria.

13. The laser cutting machine in accordance with claim 10 wherein one of the detectors is a detector of the intensity of the light generated at the cutting site.

14. The laser cutting machine in accordance with claim 10 wherein said evaluation includes determining whether the value of the gradient of the path of the control signal over time exceeds a predetermined threshold value for the gradient which comprises a usability criteria.

15. The laser cutting machine in accordance with claim 14 wherein the evaluation unit evaluates how much the value of the relative detector signal level exceeds a predetermined threshold value for the relative control signal level in the usability parameters.

16. The laser cutting machine in accordance with claim 10 wherein the cutting head includes a conductive nozzle spaced from the workpiece and one of the detectors is a device for measuring the resistance between the nozzle and the workpiece.

17. The laser cutting machine in accordance with claim 10 wherein one of the detectors is a detector of the intensity of the light generated at the cutting site and the cutting head includes a conductive nozzle spaced from the workpiece and one of the detectors is a device for measuring the resistance between the nozzle and the workpiece.

18. The laser cutting machine in accordance with claim 10 wherein two light detectors are employed and located from the laser generator to spaced relationship in the beam path.

19. The laser cutting machine in accordance with claim 18 wherein one light detector is adjacent the nozzle in the cutting head and the second light detector is disposed in the beam delivery path adjacent a reflecting mirror.

20. The laser cutting machine in accordance with claim 10 wherein the stored parameters include a primary parameter and a subordinate parameter, and favorable comparison with the primary parameter is essential to validating the detector signal.

* * * * *